United States Patent
Zeinstra et al.

(10) Patent No.: US 8,712,781 B2
(45) Date of Patent: Apr. 29, 2014

(54) SYSTEM AND METHOD FOR CUSTOMIZED PROMPTING

(75) Inventors: Mark Zeinstra, Holland, MI (US); Richard J. Chutorash, Oakland Township, MI (US); Jeffrey Golden, Holland, MI (US); Jon M. Skekloff, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1245 days.

(21) Appl. No.: 12/522,149

(22) PCT Filed: Jan. 4, 2008

(86) PCT No.: PCT/US2008/050290
§ 371 (c)(1),
(2), (4) Date: Oct. 1, 2009

(87) PCT Pub. No.: WO2008/086216
PCT Pub. Date: Jul. 17, 2008

(65) Prior Publication Data
US 2010/0049528 A1    Feb. 25, 2010

Related U.S. Application Data

(60) Provisional application No. 60/883,684, filed on Jan. 5, 2007, provisional application No. 60/878,978, filed on Jan. 5, 2007.

(51) Int. Cl.
*G10L 21/00* (2013.01)
(52) U.S. Cl.
USPC ........ 704/275; 704/235; 704/270.1; 704/257; 379/88.25; 379/93.23; 379/88.18; 379/67.1

(58) Field of Classification Search
USPC .............. 704/275, 235, 270.1, 257, 277, 270; 379/88.25, 93.23, 88.18, 88.01, 88.13, 379/88.17, 67.1; 709/219, 217, 204, 203, 709/227; 710/62; 455/3.06, 414.1, 569.1
See application file for complete search history.

(56) References Cited

U.S. PATENT DOCUMENTS

| | | | |
|---|---|---|---|
| 4,797,924 A * | 1/1989 | Schnars et al. | 704/275 |
| 4,839,749 A | 6/1989 | Franklin | |
| 5,525,977 A | 6/1996 | Suman | |
| 5,748,840 A * | 5/1998 | La Rue | 704/254 |
| 6,859,776 B1 * | 2/2005 | Cohen et al. | 704/270 |
| 6,934,756 B2 * | 8/2005 | Maes | 709/227 |

(Continued)

FOREIGN PATENT DOCUMENTS

WO    WO 2005/042314 A1    5/2005

OTHER PUBLICATIONS

European Office Action dated Dec. 21, 2011 as received in corresponding European Application No. EP08713565.3, 8 pages.

(Continued)

*Primary Examiner* — Vijay B Chawan
(74) *Attorney, Agent, or Firm* — Foley & Lardner LLP (57) ABSTRACT

A method for providing an audible prompt to a user within a vehicle. The method includes retrieving one or more data files from a memory device. The data files define certain characteristics of an audio prompt. The method also includes creating the audio prompt from the data files and outputting the audio prompt as an audio signal.

20 Claims, 7 Drawing Sheets

(56) References Cited

U.S. PATENT DOCUMENTS

| | | | | |
|---|---|---|---|---|
| 6,965,863 | B1* | 11/2005 | Zuberec et al. | 704/270 |
| 7,529,675 | B2* | 5/2009 | Maes | 704/270.1 |
| 7,844,215 | B2* | 11/2010 | Vance et al. | 455/3.06 |
| 8,165,886 | B1* | 4/2012 | Gagnon et al. | 704/275 |
| 8,397,844 | B2* | 3/2013 | Vasant | 180/65.1 |
| 2002/0184373 | A1* | 12/2002 | Maes | 709/228 |
| 2003/0236582 | A1* | 12/2003 | Zamir et al. | 700/94 |
| 2004/0267534 | A1* | 12/2004 | Beiermeister et al. | 704/275 |
| 2007/0061067 | A1* | 3/2007 | Zeinstra et al. | 701/200 |
| 2009/0248420 | A1* | 10/2009 | Basir et al. | 704/275 |

OTHER PUBLICATIONS

Kuhn, Thomas, Jameel, Akhtar, Stümpfle, Matthias and Haddadi, Afsaneh, "Hybrid In-Car Speech Recognition for Mobile Multimedia Applications", IEEE Vehicular Technology Conference, vol. 3, May 16, 1999; pp. 2009-2013.

Heinrich, Dr. C. and Stammler, Dr. W., "Sprachbedienung im Kfz. Speechdialoguesystem for Vehicles", VDI Berichte, Duesselforf, DE, No. 1287, Sep. 12, 1996; pp. 425-441.

International Search Report and Written Opinion for International Application No. PCT/US2008/050290; date of mailing Jul. 2, 2008; 10 pages.

* cited by examiner

SYSTEM AND METHOD FOR CUSTOMIZED PROMPTING

CROSS-REFERENCE TO RELATED PATENT APPLICATIONS

The present application claims the benefit of International Application No. PCT/US2008/050290 filed Jan. 4, 2008, with claims the benefit of U.S. Provisional Patent Application No. 60/878,978 filed Jan. 5, 2007, and U.S. Provisional Patent Application No. 60/883,684 filed Jan. 5, 2007, the entire disclosures of which are incorporated by reference herein.

BACKGROUND

The present application relates generally to the fields of data communication and speech recognition and particularly to speech recognition and data communication in a motor vehicle control system.

Vehicles may include a number of subsystems including an HVAC system, an audio system, and an engine management system that may be controlled by a user interface, such as a vehicle center console. Many vehicles also include capabilities to interface with external devices such as media players, mobile phones, or other handheld/mobile devices. Some vehicles are configured to communicate with mobile devices using a wireless connection, such as a Bluetooth communications protocol, an IEEE 802.11x communications protocol, an IEEE 802.16 communications protocol, or other wireless communication technology. Some vehicles may even have speech recognition capabilities, as such capabilities relate to vehicle navigation on a vehicle console or an external navigation device. However, it is noted that it would be advantageous to have a central vehicle control system that responds with customized audio prompts to events initiated and not initiated by a user, where the events initiated by the user may be verbally or non-verbally initiated.

It would be desirable to provide a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a personalized audio prompt system. The system includes a memory device configured to store at least one data file. The at least one data file defines the characteristics of an audio prompt. The system also includes a processing device coupled to the memory device. The processing device is configured to process the at least one data file to create the audio prompt. The system also includes an audio output device coupled to the processing device. The audio output device is configured to output the audio prompt.

Another embodiment relates to an in-vehicle control system for personalized audio prompts. The system includes a memory device configured to store at least a first data file. The at least first data file defines the characteristics of a first audio prompt. The system also includes a processing device coupled to the memory device. The processing device is configured to process the at least first data file. The system also includes an audio output device coupled to the processing device. The audio output device is configured to output the first audio prompt.

Yet another embodiment relates to a method for personalized audio prompts. The method includes the step of retrieving at least a first data file from a memory device. The at least first data file defines the characteristics of a first audio prompt. The method also includes the step of creating the first audio prompt from the at least first data file. The method also includes the step of outputting the first audio prompt as an audio signal.

The invention is capable of other embodiments and of being practiced or being carried out in various ways. Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
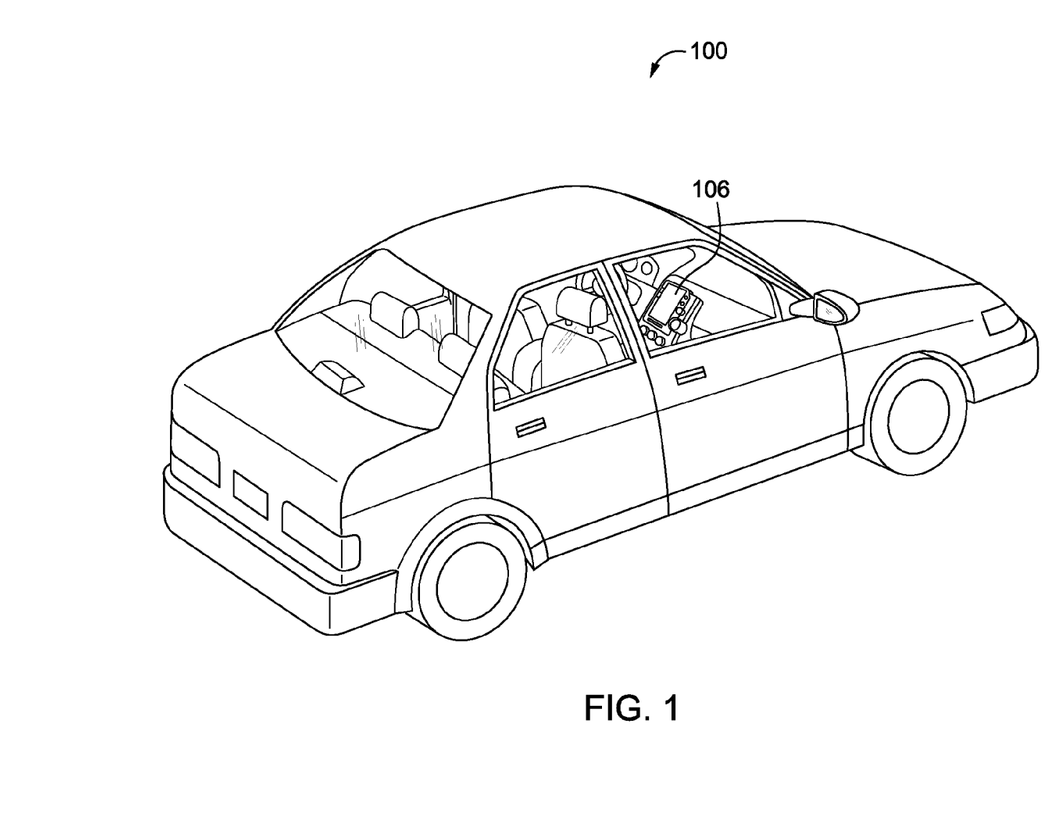
FIG. 1 is a perspective view of a motor vehicle that includes a number of vehicle systems, including an in-vehicle control system, according to an exemplary embodiment.

Referring to FIG. 1, a vehicle 100 includes a number of subsystems for user convenience and entertainment. Vehicle 100 generally includes a heating, ventilation, and air-conditioning (HVAC) system, a sound system, and an in-vehicle control system 106 (e.g., media system, navigational system, entertainment system, display system, communications systems, etc.). The HVAC system, sound system and other systems may be coupled to in-vehicle control system 106, which is capable of controlling and monitoring both systems, automatically or by a manual user command. It is noted that in various exemplary embodiments, vehicle 100, the HVAC system, the sound system, and other vehicle systems may be of any past, present, or future design that is capable of housing (in the case of vehicle 100) and interacting with in-vehicle control system 106.

Figure 2:
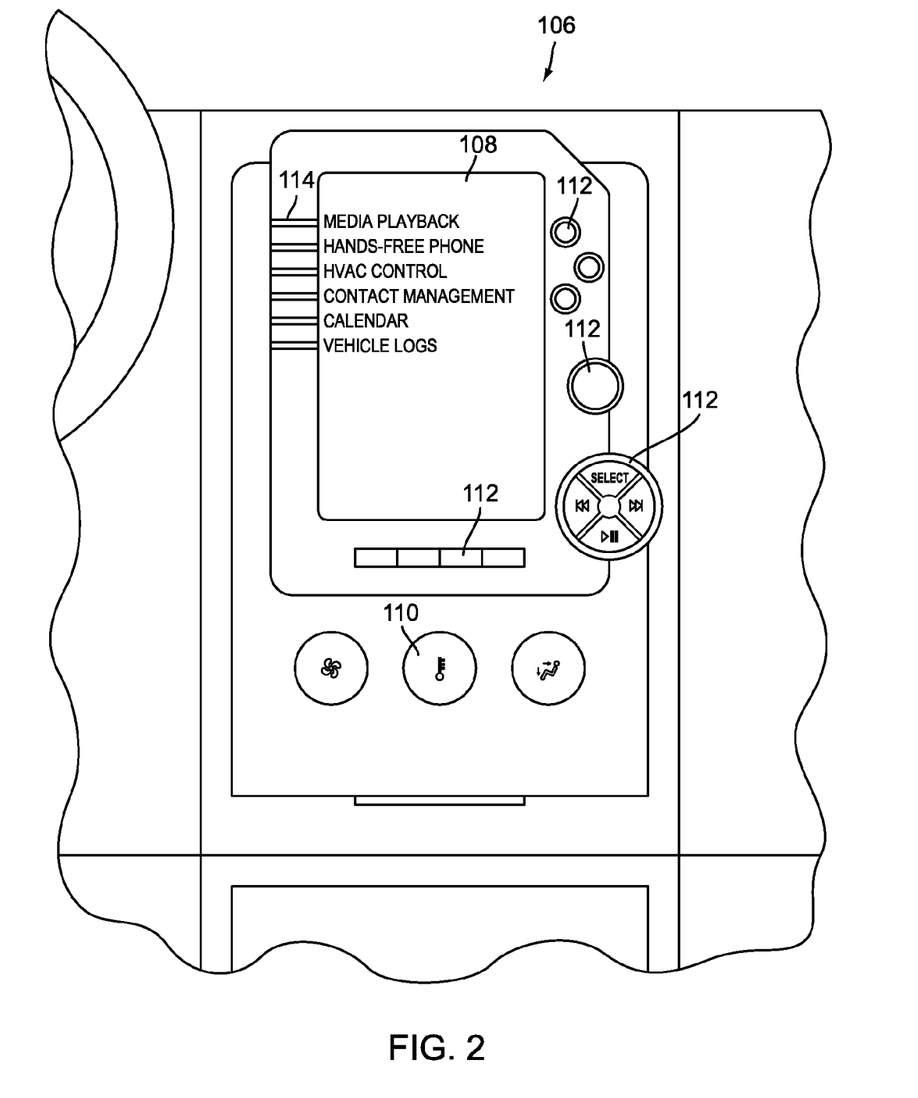
FIG. 2 is a front elevation view of the user interface of the in-vehicle control system of FIG. 1, according to an exemplary embodiment.

Referring to FIG. 2, one exemplary embodiment of in-vehicle control system 106 is shown. In-vehicle control system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g., LCD, DLP, plasma, CRT), configuration (e.g., portrait or landscape), or shape (e.g., polygonal, curved, curvilinear). Output display 108 may be a manufacturer installed output display, an aftermarket output display, or an output display from any source. Output display 108 may be an embedded display (e.g., a display embedded in the control system or other vehicle systems, parts, or structures), a standalone display (e.g., a portable display, a display mounted on a movable arm), or a display having any other configuration. Output knobs 110 and pushbuttons 112 and 114 may be configured to control functions of the HVAC system such as fan speed, cabin temperature, or routing of air flow, to control playback of media files over the sound system, to control retrieval of phonebook entries, to control a function of a connected remote source, or to control any other desired vehicle function.

Pushbuttons 114 typically allow for the selection and display of various functions of in-vehicle control system 106 including sound system control, media system control, display system control, communications system control, hands-free phone use, HVAC system control, contact or address/phone book management, calendar viewing and modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allow the user to connect in-vehicle control system 106 to a mobile phone so that speaking into the vehicle console of in-vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit, and/or dial one or more entries containing personal contact information, by use of a tactile or oral command. The operation of pushbutton 114 for calendar management may display a menu screen or execute commands that allow the user to view, list, select, sort, search for, edit, and/or create one or more entries containing personal schedule information by tactile or oral command. The operation of pushbutton 114 for vehicle log management may display a menu screen or execute commands that allow the user to input, view, select and/or reset information related to the vehicle operation (e.g., fuel economy, engine temperature, distance to empty, etc.) by tactile or oral command.

Pushbuttons 114 (and/or any other user interface element(s)) of in-vehicle control system 106 may be used to control other vehicle subsystems such as, but not limited to, vehicle door locking systems, vehicle cruise control systems, seat control systems, window control systems, vehicle lighting systems, vehicle radio system, wireless control systems, media control systems, and/or any other control system that may accept user input.

A customized audio prompt may also be generated when the user interfaces with in-vehicle control system 106 via knobs 110 and pushbuttons 112 and 114. The audio prompts might encourage the user to make a particular decision or could inform the user of the occurrence of a particular event.

Figure 3:
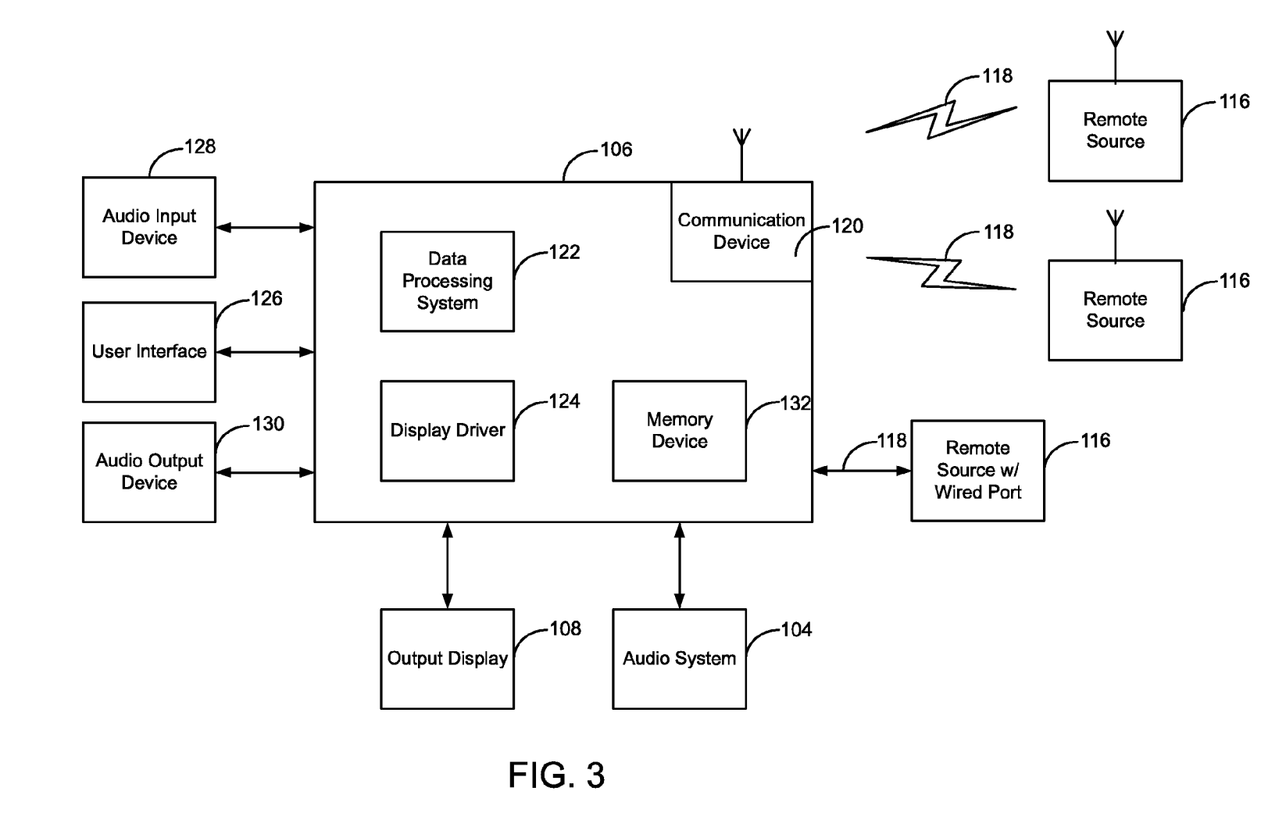
FIG. 3 is a block diagram of the in-vehicle control system of FIG. 1, according to an exemplary embodiment.

Referring to FIG. 3, in-vehicle control system 106 is capable of accessing data files from a remote source 116 over a communication link 118. For example, in-vehicle control system 106 may access media files, phonebook data files, calendar data, or any other accessible data for use by in-vehicle control system 106. In-vehicle control system 106 may be capable of accessing data files from multiple remote sources over a single or multiple communication links. In-vehicle control system 106 may also send and receive requests, signals, files, commands, messages (e.g., text messages, voice messages, etc.), meta information, stream data or information, and any other type of data to and/or from remote source 116 over communication link 118.

In-vehicle control system 106 generally includes a communication device 120, a data processing system 122, a display driver 124, a user interface 126, an audio input device 128, an audio output device 130, an output display 108, and a memory device 132.

Communication device 120 is generally configured to establish communication link 118 with remote source 116. In one exemplary embodiment, in-vehicle control system 106 may establish a wireless communication link such as with Bluetooth communications protocol, an IEEE 802.11 protocol, an IEEE 802.15 protocol, an IEEE 802.16 protocol, a cellular signal, a shared wireless access protocol-cord access (SWAP-CA) protocol, a wireless universal serial bus (USB) protocol, or any other suitable wireless technology. In another exemplary embodiment, in-vehicle control system 106 may establish a wired communication link such as with USB technology, IEEE 1394 technology, Firewire technology, optical technology, other serial or parallel port technology, or any other suitable wired link. According to various other exemplary embodiments, in-vehicle control system 106 and communication device 120 may form both wireless and wired connections with a plurality of remote source 116s. Communication links may be formed such that communication device 120 may be simultaneously connected to multiple remote source 116s. Communication device 120 may send and receive one or more data streams, data strings, data files and/or other types of data (e.g., non-file based data) from remote source 116. In various exemplary embodiments, the data files may include text, numeric data, audio, video, program data, command data, information data, coordinate data, image data, streaming media, or any combination thereof.

Data processing system 122 is coupled to communications device 120 and is generally configured to control each function of in-vehicle control 106. Data processing system 122 may facilitate speech recognition capabilities of in-vehicle control system 106 for the convenience of the user. Data processing system 122 may include digital or analog processing components and/or be of any past, present, or future design that facilitates control or provides processing features to in-vehicle control system 106. Data processing system 122 may be a single data processing device or multiple data processing devices. Data processing system 122 may be a data processing device having data processing sub-devices or components. Data processing system 122 may include any combination of program software and hardware capable of providing control, display, communications, input and output features to the vehicle. Data processing system 122 may coordinate, control, and/or facilitate the various devices, components and features of the in-vehicle control system (e.g., communications device 120, output display 108, display driver 124, memory device 132, audio system 104, user interface 126, audio input device 128, audio output device 130, etc).

Display driver 124 is coupled to output display 108 and is typically configured to provide an electronic signal to output display 108. In one exemplary embodiment, the electronic signal may include the text and/or numeric data of the data files, while in other exemplary embodiments, any other desired data may be included with the text and/or numeric data or by itself in the electronic signal to output display 108. In another exemplary embodiment, display driver 124 may be configured to control output display 108 with touch-screen capabilities, while in other exemplary embodiments, display driver 124 may be configured to control output display 108 without making use of touch-screen capabilities. Display driver 124 may include any number of functions, software or hardware, to facilitate the control and display of images on output display 108. In still other exemplary embodiments, display driver 124 may be of any past, present, or future design that allows for the control of output display 108.

User interface 126 is typically configured to facilitate tactile user interaction with in-vehicle control system 106. In various exemplary embodiments, user interface 126 may include pushbuttons or rotatable knobs as in the exemplary embodiment of FIG. 2 in any similar or dissimilar configuration or may include other tactile user contact points.

Audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation.

Memory device 132 is configured to store data accessed by in-vehicle control system 106. For example, memory device 132 may store data input by remote source 116, data created by data processing system 122 that may be used later, intermediate data of use in current calculation or process, or any other data of use by in-vehicle control system 106.

Figure 4:
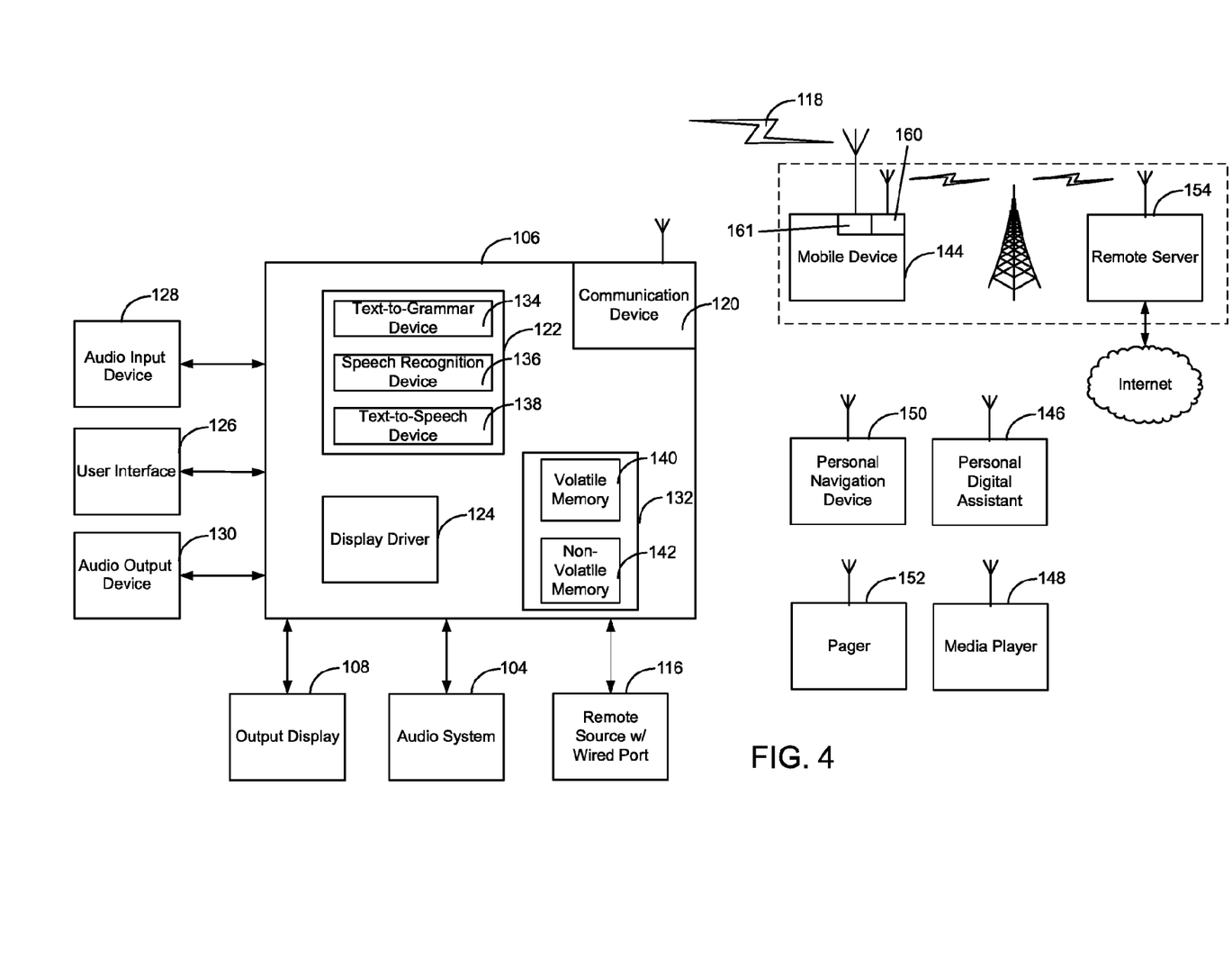
FIG. 4 is a more detailed embodiment of the in-vehicle control system of FIG. 3, according to one exemplary embodiment.

Referring to FIG. 4, in-vehicle control system 106 and remote source 116 are shown in greater detail. Data processing system 122 may generally include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 is preferably coupled to communications device 120 and is generally configured to generate a phonemic representation of the text and/or numeric data of each of the data files received by communications device 120 from remote source 116. The phonemic representation of the text and/or numeric data of each data file may be configured to facilitate speech recognition of each data file. After conversion of a data file to a phonemic representation, the data file may be accessed via an oral input command received by speech recognition device 136 via audio input device 128.

Speech recognition device 136 is typically configured to receive an oral input command from a user via audio input device 128. Speech recognition device 136 compares the received oral input command to a set of predetermined input commands, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. According to an exemplary embodiment, speech recognition device 136 may be able to trigger or activate a display reproduction mode when certain commands are recognized. Furthermore, speech recognition device 136 may be able to pass commands to remote source 116 to facilitate interactive control of remote source 116 via a communication link.

Text-to-speech device 138 is generally configured to convert the text and/or numeric data of each data file received from remote source 116 into an audible speech representation. This functionality may allow in-vehicle control system 106 to audibly give data to the user via audio output device 130 or audio system 104. For example, in-vehicle control system 106 may repeat a user selected function back to the user, provide navigational information, announce directions, announce menu options, announce media file information, provide phonebook or contact information, or other information related to data stored in memory 132, remote source 116, remote server 154, etc.

According to various other exemplary embodiments, text-to-grammar functionality, speech recognition functionality, and text-to-speech functionality are implemented primarily in software and data processing system 122, which is a general purpose data processing system. According to yet other exemplary embodiments, text-to-grammar functionality, speech recognition functionality, and text-to-speech functionality are implemented partially in software and partially in hardware.

Memory device 132 includes both a volatile memory 140 and a non-volatile memory 142. Volatile memory 140 may be configured so that the contents stored therein may be erased during each power cycle of in-vehicle control system 106 or vehicle 100. Non-volatile memory 142 may be configured so that the contents stored therein may be retained across power cycles, such that upon in-vehicle control system 106 and/or vehicle 100 power-up, data from previous system use remains available for the user. According to an exemplary embodiment non-volatile memory 142 may store one or more user profiles, display profiles, communications profiles, navigation profiles, or any other type of user or system setting file.

According to an exemplary embodiment, remote source 116 may be any suitable remote source that includes a transceiver and is able to interface with in-vehicle control system 106 over communication link 118, in either a wireless or wired embodiment. In various exemplary embodiments, remote source 116 may be one or more of a mobile phone 144, a personal digital assistant (PDA) 146, a media player 148, a personal navigation device (PND) 150, a pager, 152, a remote server 154 that may be coupled to the Internet, or various other remote data sources. Remote source 116 may have a storage device, one or more processing devices, and one or more communications devices. According to various exemplary embodiments, remote source 116 may connect to the Internet or any other remote source with first communication device 160 while communicating with in-vehicle control system 106 using second communication device 161. Still in another exemplary embodiment, the internet connection allows the user to download data files, including software updates and patches, for in-vehicle controls system's audio prompts. The audio prompts may be the voice of celebrities, cartoon characters, an accented voice, a sarcastic voice, etc.

Figure 5A:
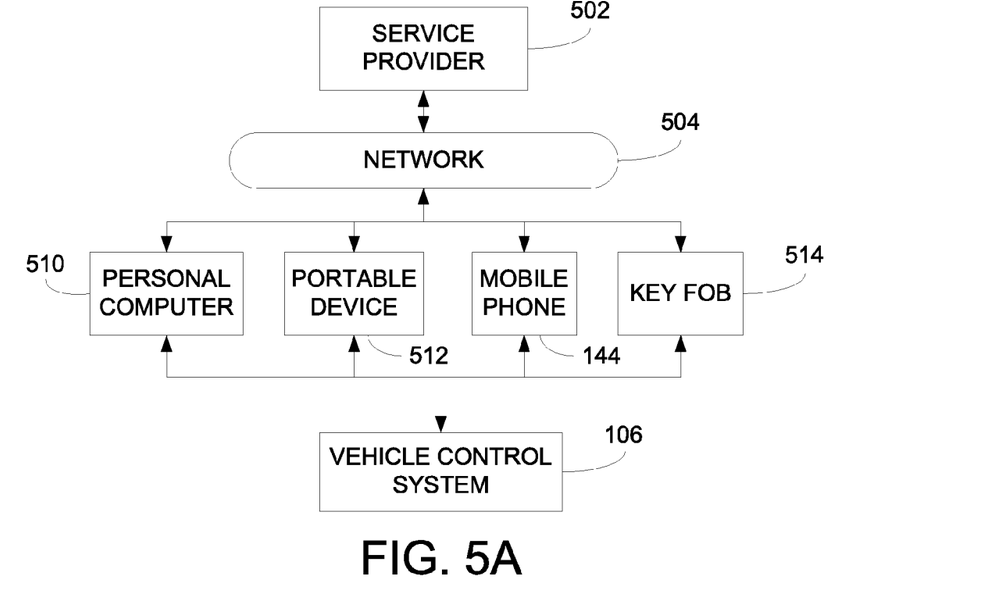
FIG. 5A is a block diagram of a personalized audio prompt system, according to an exemplary embodiment.

Referring to FIG. 5A, a block diagram of a personalized audio prompt system is shown, according to an exemplary embodiment. Vehicle control system 106 is shown coupled to various remote devices, either wirelessly or via a wired connection. For example, vehicle control system 106 may connect wirelessly to personal computer 510 or via a wired connection within the vehicle. Vehicle control system 106 may couple to portable device 512 (e.g., a PDA 146, PND 150, pager 152 of FIG. 4, etc.). Other examples of remote devices may include mobile phone 144 or key fob 514.

Service provider 502 is shown coupled to network 504 and may be responsible for providing data regarding various types of audio prompts. For example, service provider 502 may allow a user to personalize an audio prompt system of vehicle control system 106 with various settings. Settings may include voice tone (e.g., male or female voice), language or dialect (e.g., English accent, German accent, French accent, etc.), voice speed, greetings, updated vocabulary, and other voice characteristics. Service provider 502 may includes updates or patches to current existing audio prompt systems. The data may be provided from service provider 502 in various formats. For example, the data may include textual information stored in a table or otherwise. By way of further example, audio versions of phrases, words, characters, phonemes, or other parts of speech may be provided in an MP3 or other playback format.

The various remote sources shown may access data from service provider 502 through network 504 and provide the data to vehicle control system 106, via a wireless or wired connection. Remote devices 510, 512, 144, and 514 may each include a non-volatile memory device to store the data from service provider 502 if vehicle control system 106 is not available to immediately receive the data.

Figure 5B:
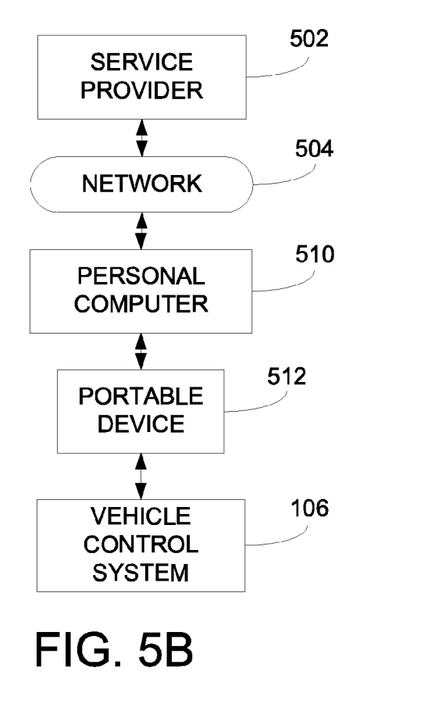
FIG. 5B is a block diagram of a personalized audio prompt system, according to another exemplary embodiment.

Referring to FIG. 5B, a block diagram of a personalized audio prompt system is shown, according to another exemplary embodiment. Personal computer 510 may receive data from service provider 502 through network 504 and store the data in memory. A user of the vehicle may use personal computer 510 to obtain the data from service provider 502 without using vehicle control system 106, allowing the user to obtain the data in a workplace, at home, etc.

Portable device 512 may connect to personal computer 510 either wirelessly (e.g., a cell phone or PDA) or via a wired interface (e.g., a USB port) and receive the data stored in personal computer 510. Portable device 512 may then connect to vehicle control system 106, either wirelessly or via a wired interface, and may provide the data to vehicle control system 106. The data may be used to change various properties of the personalized audio prompt system, provide additional options for the personalized audio prompt system, update stored data in the memory of vehicle control system 106, etc.

Figure 5C:
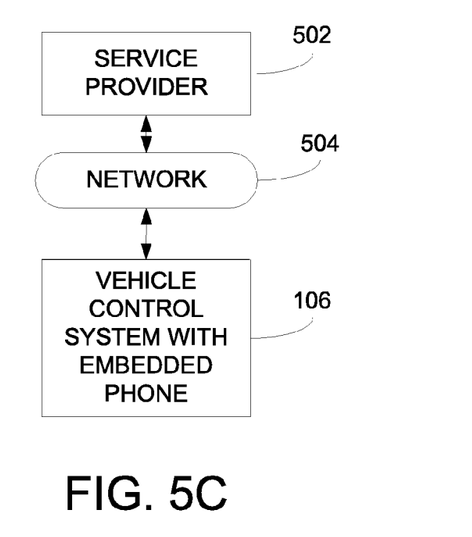
FIG. 5C is a block diagram of a personalized audio prompt system, according to yet another exemplary embodiment.

Referring to FIG. 5C, a block diagram of a personalized audio prompt system is shown, according to yet another exemplary embodiment. Vehicle control system 106 may connect directly to service provider 502 via network 504. Vehicle control system 106 may use an embedded phone (e.g., a mobile or cellular phone coupled to vehicle control system 106, etc.) or other remote device that can connect wirelessly to service provider 502. The use of the system as shown in FIG. 5C allows a user of the vehicle to update a personalized audio prompt system when the user is in the vehicle instead of receiving the updated data while not occupying the vehicle.

Figure 6A:
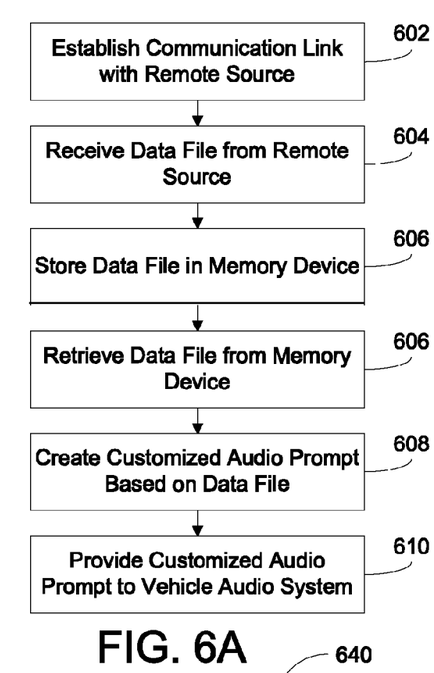
FIG. 6A is a flow diagram of a method of generating a personalized audio prompt from a data file accessed from a remote source, according to an exemplary embodiment.

Referring to FIG. 6A, a flow diagram of a method 600 of generating a personalized audio prompt from a data file accessed from a remote source is shown, according to an exemplary embodiment. Vehicle control system 106 of the vehicle establishes communication link 118 (shown in FIG. 3) with a remote source or service provider (e.g., service provider 502 of FIGS. 5A-5C) (step 602). The establishment of communication link 118 may be initiated according to default settings, automatically, according to user preferences, or manually. In various exemplary embodiments, vehicle control system 106 may establish a wireless or wired link. The remote source could be any type of mobile device described above in FIGS. 4-5, such as mobile phone 144, PDA 146, an MP3 Player, or an internet server. The remote source could also be a removable storage media, such as flash memory, a USB thumb drive, a CD, a DVD, or any other removable media. Furthermore, the data could be provided in other ways and through other instrumentalities, such as via a data file download at an automotive dealer (e.g., dealer performs a software patch update of the data files when the vehicle is brought in for service), an automotive manufacturer (e.g., manufacturer downloads a standard set of data files for a standard set of audio prompts), or an audio parts manufacturer (e.g., audio parts delivered to automotive manufacturer with files already downloads by audio parts manufacturer).

A data file from the remote source may be accessed (step 604). The data file may be accessed according to system default settings, automatically, according to user preferences, or manually. For example, a graphical user interface (GUI) and/or voice user interface (VUI) may be provided to the user via the in-vehicle control system. The step of receiving a data file from a remote source may include requesting a data file having certain characteristics from the remote source. Accordingly, based on user input or otherwise, the in-vehicle control system may generate one or more requests for response by the remote source. Once the completed data file is received, the data file may be stored in a memory device (e.g., memory 132 of FIGS. 3-4) for immediate or future use (step 606).

After an automated or user-initiated activity, the stored data file is retrieved from memory (step 608). According to an exemplary embodiment, the data file defines certain characteristics of the audio prompt which might include a tone for the audio prompt, a central octave of the audio prompt, a central frequency of the audio prompt, the speed of the audio prompt, identification of certain phonemes that should be emphasized, said differently, or deemphasized, speed of certain phonemes, etc.

In various exemplary embodiments the characteristics may be defined to produce a celebrity voice, a cartoon character voice, or a male or female voice as an audio prompt. Data processing system 122 (of FIG. 3) uses the data file retrieved to generate or assist in generating a customized audio prompt (step 608). In an exemplary embodiment the data processing system employs text-to-speech device 138 of FIG. 4. Text-to-speech device 138 may use the data file to generate the customized audio prompt or assist in converting text or numeric data into an audible speech representation to be used as the audio prompt. The new or processed audio prompt characteristics, along with other prompt settings, may be stored in a memory device for future use. According to various exemplary embodiments, the data file received from the remote source is in a relatively final form and the data file resides on the in-vehicle control system for processing prior to creation of every audio prompt. Using a data file that a text-to-speech module or text-to-speech engine may process to generate audio prompts may result in higher degrees of customization for the user, faster download times from the remote source, and save storage space on the in-vehicle control system (e.g., relative to a system where each prompt or character is pre-stored as an audio file).

Certain characteristics of the audio prompt may also be determined or otherwise customized after receipt of the data file at the in-vehicle control system based on the user's personal preferences and/or GUI or VUI input. An audio output device of vehicle control system 106 outputs the customized audio prompt as an audio signal (step 610).

Figure 6B:
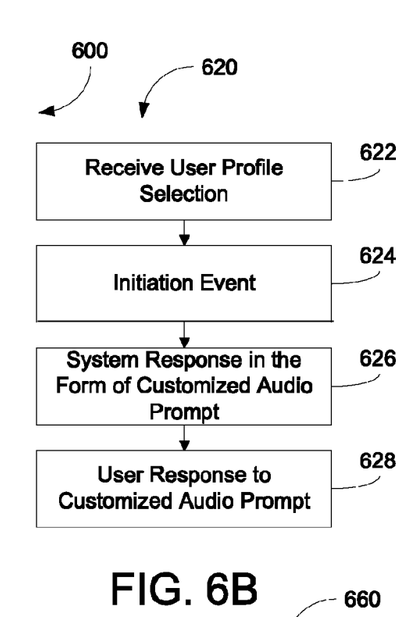
FIG. 6B is a flow diagram of a method of generating a personalized audio prompt during vehicle control system operation, according to an exemplary embodiment.

Referring to FIG. 6B, a flow diagram of a method 620 for personalizing an audio prompt during vehicle control system operation is shown, according to an exemplary embodiment. A user may select a particular profile that contains settings defining the characteristics of the audio prompt (step 622). The profile may be associated with a data file described above with respect to previous FIGS. A vehicle may have several users, each having his or her own particular preferences for the type of audio prompt used (e.g., male, female, celebrity, cartoon character, etc.). According to various exemplary embodiments, the vehicle may be configured to recognize which profile to use upon start-up of the vehicle based on a seat position, a vehicle key used, a vehicle key fob detected, and/or a connected portable device detected (e.g., a Bluetooth phone detected, etc.). Furthermore, each user may want to have their own settings defining what events result in an audio prompt (e.g. one user may not want the audio prompt to say "the door is open" every time the door opens, while another user may prefer this response). In addition, an individual user may want to set up multiple profiles to be used depending on, for example, a particular mood, destination, or time of day.

In addition to receiving a user profile selection (step 622) and parsing or processing the user profile, process 620 may include any number of initialization or initiation events (step 624). These events or steps may include accessing one or more data files (e.g., the data file of process 600), caching the data file, and/or otherwise preparing to utilize the data file for audio prompt generation. According to various exemplary embodiments, the system may also conduct pre-processing on the data file (e.g., generating a few frequently used or relied-upon phrases and storing the phrases as audio files). Pre-processing may be completed according to user profile selections or according to vehicle status information.

Once initiated, the system may begin responding to events that trigger audio prompts. A triggering event may be initiated by the user (e.g. setting cruise control) or not initiated by the user (e.g. gas is almost empty). In one exemplary embodiment the user may manipulate the user profile settings to determine what events result in an audio prompt. For example, the user profile settings may allow the user to enter different textural phrases for different events. These textural phrases may be used by the text-to-speech system along with the data file to result in a customized audio prompt that not only presents tonal customization, but also content customization. By way of example, the user may setup a prompt that is played whenever the user is traveling above a detected speed limit. The user may enter the text (via a GUI or VUI) "please slow down", if the user prefers a polite prompt, or may enter "slow down now!", if the user prefers a more direct prompt.

Vehicle control system 106 is configured to use the data file and/or the profile information to respond to the triggering event with a personalized (e.g., customized) audio prompt (step 626). If necessary, the user responds to the audio prompt (step 628). In one exemplary embodiment vehicle control system 106 is equipped with speech recognition device 136 and recognizes oral input from the user. In another exemplary embodiment the user responds using a tactile interface, such as knobs 110, pushbuttons 112 and 114, or a touch screen. The appropriate response may also include a physical action (e.g., filling the vehicle fuel tank if the prompt related to low fuel status).

Figure 6C:
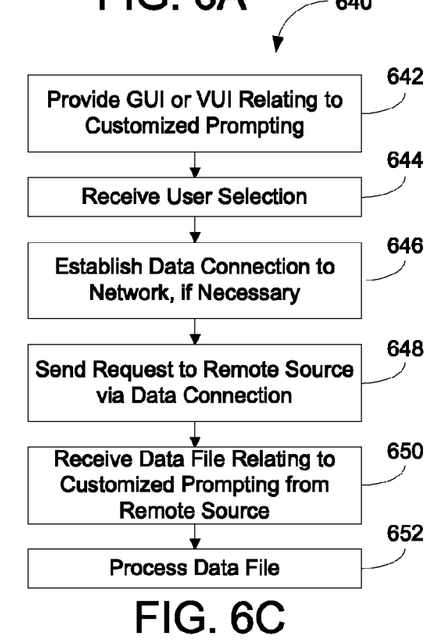
FIG. 6C is a flow diagram of a method of requesting and obtaining a data file relating to personalizing an audio prompt, according to an exemplary embodiment.

Referring to FIG. 6C, a flow diagram of a method 640 of requesting and obtaining a data file relating to personalizing an audio prompt is shown, according to an exemplary embodiment. Vehicle control system 106 may provide a GUI and/or VUI relating to customized prompting to the user of the vehicle (step 642). The GUI and/or VUI may provide a list of choices for a user to choose from, a method of searching for a particular setting, and/or other searching options. A user selection may be received (and interpreted, if necessary) (step 644). Receiving and interpreting the user selection may include processing to determine whether or not the control system must establish a data connection to handle the user selection. For example, if a user selects a profile and/or customized prompting data file that is already stored in memory, a data connection to a remote source need not be established and the stored data file can immediately be processed.

If necessary, a data connection to a network may be established (step 646). Step 646 may be similar to step 602 of FIG. 6A. The data connection to the network may provide a connection to a remote source. A request relating to the user selection may be sent to the remote source via the data connection (step 648). The remote source may receive the request and send a corresponding data file. According to various exemplary embodiments, the remote source may respond with graphical user interfaces for display on the vehicle control system. The graphical user interfaces may include a list of voices or characters available for download. According to various other exemplary embodiments, the graphical user interface is generated by the vehicle control system and a list of available data files is sent from the remote source to the vehicle control system. Using the list, and a vehicle GUI, a vehicle VUI, and/or the vehicle control system, a request for a specific data file may be sent to the remote source.

Regardless of how the request is generated, the remote source may respond to the request by sending the data file to the vehicle control system. The vehicle control system will receive the data file relating to customized prompting from the remote source (step 650). The data file is then processed (step 652). Processing step 652 may include any of the activities previously described, alternative activities, and/or additional activities to generate a customized audio prompt.

Figure 6D:
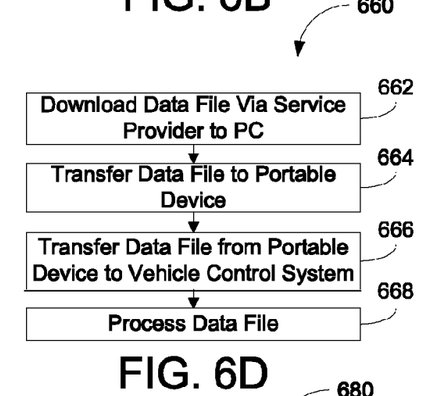
FIG. 6D is a flow diagram of a method of obtaining a data file to create a customized audio prompt, according to another exemplary embodiment.

Referring to FIG. 6D, a flow diagram of a method 660 of obtaining a data file is shown, according to an exemplary embodiment. The data file may be downloaded from a service provider (or other remote source) to a personal computer (step 662). Alternatively, the data file may be downloaded to another remote device. The data may be downloaded via a wireless or wired connection.

A portable device may be coupled to the personal computer and the personal computer may transfer the data file to the portable device (step 664). The portable device may couple to the personal computer either wirelessly or via a wired connection. As an example, the portable device may be a USB flash drive. The portable device may be configured to couple to a vehicle control system, and the portable device may transfer the data file to the vehicle control system (step 666). This step may include synchronizing a portion of memory of the portable device with the control system. For example, the in-vehicle control system may search a portion of the portable device for a new data file that it should receive. Once received, the vehicle control system processes the data file (step 668), which may include configuring a personalized audio prompt based on the data file, preprocessing the data file, extracting the data file (if compressed), decrypting the data file (if encrypted), storing the data file in memory, or any other related task.

Figure 6E:
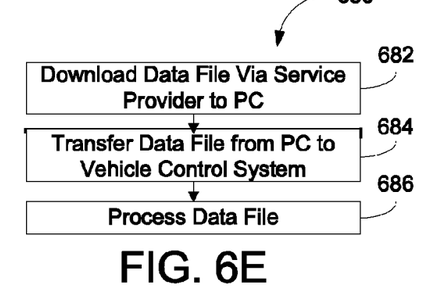
FIG. 6E is a flow diagram of a method of obtaining a data file to create a customized audio prompt, according to yet another exemplary embodiment.

Referring to FIG. 6E, a flow diagram of a method 680 of obtaining a data file is shown, according to another exemplary embodiment. The data file may be downloaded from a service provider (or other remote source) to a personal computer (step 682). The personal computer may be configured to communicate wirelessly with a vehicle control system of a vehicle, and the personal computer may transfer the downloaded data file to the vehicle control system (step 684). The step of transferring the data file from the PC to the vehicle control system may be initiated and/or carried out via a GUI of the PC or a GUI of the vehicle control system. For example, if the PC and vehicle control system are connected to the same network (e.g., via a wireless connection), a GUI provided on the PC may allow the user to "drag" the data file from the PC to a storage device of the in-vehicle control system. By way of further example, the vehicle control system may include an automatic synchronization feature (or a manually triggered synchronization feature) that causes the vehicle control system to synchronize setup files and/or audio prompt data files with those of the home PC. Such synchronization triggering may occur, for example, when the vehicle comes into operative proximity of the home network and is able to connect. The vehicle control system processes the data file (step 686) once received, which may include configuring a personalized audio prompt, storing the data file in memory, or any other related task.

Figure 7A:
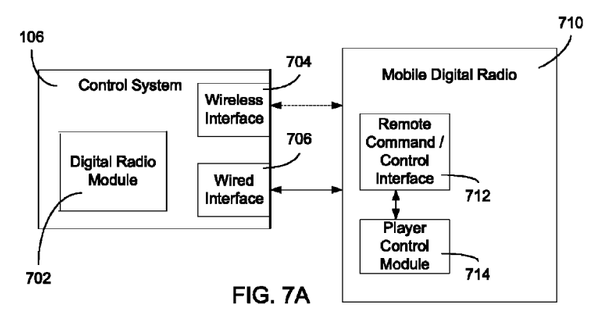
FIG. 7A is a block diagram of a control system coupled to a mobile digital radio, according to an exemplary embodiment.
Figure 7B:
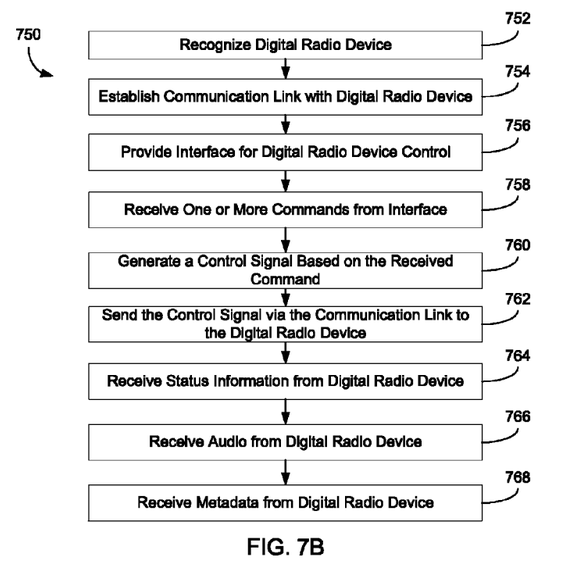
FIG. 7B is a flow diagram of a method of using the digital radio device of FIG. 7A, according to an exemplary embodiment.

Referring now to FIGS. 7A and 7B, one type of media player is a mobile digital radio, for example, a satellite digital audio receiver system (SDARS) or a high-definition digital radio (HD radio). Mobile digital radios may be capable of being moved by a user between the vehicle, office or workplace, home, or other locations (e.g., the user taking the radio into a shopping center, using the radio while at an exercise station, etc.). The mobile digital radio may be a "standalone" device (e.g., the radio is functional without the use of an additional device or may be used in conjunction with another device. The mobile digital radio may generally connect to an audio input (e.g., a computer at a workplace or home, a vehicle control system of a vehicle, etc.) using an audio output device of the mobile digital radio. Alternatively, the mobile digital radio may connect wirelessly with another device.

Other examples of media players may include a satellite radio, an HD SDARS radio, satellite video (e.g., a TV), video via WiMax or other technology, and other handheld video devices.

As discussed in FIG. 3, a vehicle control system may be configured to send and receive data to and/or from a remote source over a communication link. As an example, vehicle control system 106 may input satellite radio service content that is being received in "real time" by the mobile digital radio player, satellite service content that was previously received by and stored in the mobile digital radio player, and/or any other data stored in the mobile digital radio player that is usable by vehicle control system 106.

Referring to FIG. 7A, a block diagram of control system 106 coupled to a mobile digital radio 710 is shown, according to an exemplary embodiment. Control system 106 may include a digital radio module 702 configured to accept an input from mobile digital radio 710 and configure the input for an audio output device of control system 106, as well as be configured to accept an input from an input device of control system 106. Control system 106 may couple to mobile digital radio 710 either via wireless interface 704 or wired interface 706.

Mobile digital radio 710 may include a remote command and control interface 712. Interface 712 may be configured to accept a user input, either via audible command or tactile input, relating to command and control signals. Interface 712 may pass the received signals to a digital radio player which controls the functions of radio 710 based on the received signals. In various exemplary embodiments, the functions may include one or more of satellite channel selection, playback of stored satellite radio service content, storing, deleting, and/or otherwise managing received satellite radio service content, volume control, and/or any other current-implemented or later-developed or unimplemented function of radio 710.

Player control module 714 may be included in radio 710. Module 714 may relate to controlling various functions of radio 710. The functions may relate to the choice of audio file to play, the genre of audio files to select from, volume levels, and other audio properties. Module 714 may provide control system 106 with data corresponding to steps 764-768 of FIG. 7B. Radio 710 may include various technologies, hardware, software, algorithms, and any other resource that may be necessary or desirable to effect authentication, encryption, decryption, and the like that may be required to enable interface 712 to radio 710.

Referring to FIG. 7B, a flow diagram of a method 750 of using the digital radio device of FIG. 7A is shown, according to an exemplary embodiment. A control system of a vehicle may recognize the digital radio device (step 752). Step 752 may occur when a user or control system initializes the method, may occur when the digital radio device couples to the control system, or may occur when the digital radio devices comes within a wireless range of the control system. A communication link, either wireless or wired, is established between the control system and digital radio device (step 754). The control system provides a user interface (e.g., a GUI, a VUI, a text user interface (TUI), etc.) for a user of the vehicle (step 756). The user may use the interface to send a command to the digital radio device. The control system receives the commands (step 758) and generates a control signal based on the received command (step 760). The control signal is sent via the communication link to the digital radio device (step 762).

The digital radio device may provide the control system with status information (step 764), audio (step 766), and metadata (step 768). Status information may relate to the status of the digital radio device (e.g., the products and services offered by the digital radio device, if various products and services are available or not, operational state, status, or associated ancillary information, etc.). The audio may be audio requested by the user via the user interface. Meta information may relate to data associated with the audio (e.g., if a song is provided, artist, album, genre, and other music properties).

According to an exemplary embodiment, the digital radio is included in or integral with control system 106 and the interface between the digital radio and control system 106 is implemented primarily in software.

While the exemplary embodiments illustrated in the Figures and described herein are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

It is important to note that the construction and arrangement of the systems and methods as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system 106, memory device 132, communication device 120, data processing system 122, remote source 116, remote server 154, etc.), the position of elements may be reversed or otherwise varied (e.g., the components of control system 106, etc.), and the nature or number of discrete elements or positions may be altered or varied (e.g., communications device 120, memory device 132, the components of control system 106, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A control system for mounting in a vehicle, the vehicle including an audio system, the system comprising:
    a memory device configured to store at least one data file, the at least one data file defining a characteristics of an audio prompt;
    a processing device coupled to the memory device, the processing device being configured to generate the audio prompt from the data file;
    wherein the processing device is configured to cause the audio prompt to be output by the audio system;
    wherein a processing circuit is configured to allow a user to manipulate a user profile setting to set one or more triggering vehicle events to result in the audio prompt being output by the audio system.

2. The control system according to claim 1, further comprising:
    an interface module coupled to the audio system, the interface module being configured to provide the generated audio prompt to the audio system.

3. The control system according to claim 1, wherein the one or more triggering vehicle events is not initiated by a user.

4. The control system according to claim 1, wherein the one or more triggering vehicle events is initiated by a user.

5. The control system according to claim 1, further including a transceiver for connecting to a remote source to obtain the at least one data file for storage in the memory device.

6. The control system according to claim 1, further including a speech recognition device configured to receive an oral input from a user.

7. The control system according to claim 6, wherein the speech recognition device determines an appropriate audio response based on the oral input received from the user, and wherein the processing device generates the audio prompt based on the determined audio response.

8. The control system according to claim 1, further including a removable storage device for storing the at least one data file.

9. A method for providing an audible prompt to a user within a vehicle having an audio system, the method comprising:
retrieving at least a first data file from a memory device, the at least first data file defining certain characteristics of a first audio prompt;
receiving a first user profile setting, wherein the first user profile setting includes one or more triggering vehicle events that result in the first audio prompt;
creating the first audio prompt from the at least first data file; and
outputting the first audio prompt as an audio signal in response to the one or more triggering vehicle events.

10. The method of claim 9, further comprising obtaining the at least first data file from a remote source for storage in the memory device.

11. The method of claim 9, wherein the one or more triggering vehicle events is an event initiated by the user.

12. The method of claim 9, wherein the one or more triggering vehicle events is an event not initiated by the user.

13. The method of claim 9, further comprising switching to a second audio prompt, wherein the second audio prompt is associated with a second user profile setting, wherein a characteristic of the second audio prompt is defined by a second data file stored in the memory device, and wherein the first audio prompt is configured to operate with a first user and the second audio prompt is configured to operate with a second user.

14. The method of claim 9, further comprising:
receiving an oral input from a user and determining an appropriate audio response based on the oral input received from the user, and wherein the processing device is configured to create the first audio prompt based on the determined audio response.

15. The method of claim 14, wherein the oral input, the first audio prompt, and the audio response relate to the command and/or control of a digital radio device.

16. The control system according to claim 1, wherein the audio prompt comprises speech related to the one or more triggering vehicle events.

17. The control system according to claim 1, wherein the user profile setting is associated with a first key fob.

18. The control system according to claim 17, wherein a second user profile setting is associated with a second key fob.

19. The method of claim 9, wherein the first audio prompt comprises speech related to the one or more triggering vehicle events.

20. The method of claim 9, wherein the first user profile setting is associated with a detected portable device.

* * * * *